(12) United States Patent
Liu et al.

(10) Patent No.: US 12,345,621 B2
(45) Date of Patent: Jul. 1, 2025

(54) FRACTURE PLUGGING SIMULATION EXPERIMENTAL DEVICE AND EXPERIMENTAL METHOD THEREOF

(71) Applicant: SOUTHWEST PETROLEUM UNIVERSITY, Sichuan (CN)

(72) Inventors: Yang Liu, Chengdu (CN); Tianshou Ma, Chengdu (CN); Sitong Chen, Chengdu (CN); Xingyun Xiang, Chengdu (CN); Yezhong Wang, Chengdu (CN); Yingjie Chen, Chengdu (CN); Gui Wang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/895,372

(22) Filed: Sep. 24, 2024

(65) Prior Publication Data

US 2025/0102413 A1  Mar. 27, 2025

(30) Foreign Application Priority Data

Sep. 26, 2023 (CN) .......................... 202311264246.5

(51) Int. Cl.
*G01N 15/08* (2006.01)
*G01N 11/00* (2006.01)
*G01N 11/04* (2006.01)

(52) U.S. Cl.
CPC ... *G01N 15/0826* (2013.01); *G01N 2011/006* (2013.01); *G01N 11/04* (2013.01); *G01N 15/088* (2013.01); *G01N 2203/0246* (2013.01)

(58) Field of Classification Search
CPC .... E21B 43/261; E21B 2200/20; E21B 33/13; E21B 47/117; G06F 30/20;
(Continued)

(56) References Cited

U.S. PATENT DOCUMENTS

| | | | |
|---|---|---|---|
| 2012/0152000 A1* | 6/2012 | Jamison | G01N 33/2823 73/54.14 |
| 2014/0216149 A1* | 8/2014 | Zhou | G01N 33/2823 73/152.18 |
| 2023/0193704 A1* | 6/2023 | Jamison | G01N 21/90 73/152.23 |

FOREIGN PATENT DOCUMENTS

| | | |
|---|---|---|
| CN | 103510944 A | 1/2014 |
| CN | 107402120 A | 11/2017 |

(Continued)

OTHER PUBLICATIONS

Chen Z, Wu G, Zhou J, Ai C, Zhang A, Xie X, Wu J, Kong X, Li S. Optimization of degradable temporary plugging material and experimental study on stability of temporary plugging layer. Frontiers in Physics. Aug. 21, 2023;11:1167215. (Year: 2023).*

(Continued)

*Primary Examiner* — Eunhee Kim
(74) *Attorney, Agent, or Firm* — Porus IP LLC

(57) ABSTRACT

Disclosed is a fracture plugging simulation experimental device and an experimental method thereof. The device comprises a simulated wellbore, a simulated formation, a simulated fracture, a plurality of pressure sensors and vales, a mixing barrel, a liquid injection port and a pressurization port, a liquid collection tank, a plugging fluid storage tank, a heating device, etc. The method comprises: loading the simulated formation with the simulated fracture in the simulated wellbore, closing the second valve and turning on the mixing device, injecting a lost circulation material into the mixing barrel, closing the liquid injection port and turning on the heating device and pressurizing, stopping pressurizing and opening the second valve to establish a plugging process, turning on the plunger pump to continue pressurizing, and collecting a fluid pressure change of the (Continued)

simulated fracture in the plugging process; and calculating a pressure-bearing capacity of plugged fracture.

7 Claims, 3 Drawing Sheets

(58) Field of Classification Search
CPC .. G01N 15/0826; G01N 11/04; G01N 15/088; G01N 2011/006; G01N 2203/0246; G01N 33/00; Y02E 10/10
See application file for complete search history.

(56) References Cited

FOREIGN PATENT DOCUMENTS

| CN | 110359897 A | 10/2019 |
|---|---|---|
| CN | 110826142 A | 2/2020 |
| CN | 113622900 A | 11/2021 |
| CN | 114893147 A | 8/2022 |
| CN | 115929287 A | 4/2023 |
| CN | 116306374 A | 6/2023 |
| WO | 2012170382 A1 | 12/2012 |
| WO | 2013043531 A1 | 3/2013 |

OTHER PUBLICATIONS

First Office Action in Chinese Application No. 202311264246.5 mailed on Jan. 5, 2024, 23 pages.
Notification to Grant Patent Right for Invention in Chinese Application No. 202311264246.5 mailed on Mar. 4, 2024, 4 pages.
Xia, Binwei et al., Experimental Study of Propagation Of Directional Fracture With Slotting Hydraulic Blasting, Journal of China Coal Society, 41(2): 432-438, 2016.
Li, Song et al., Numerical Investigation into the Influence of Plug Zone on Fracture Deformation in Lost Circulation Controlling, Natural Gas Geoscience, 26(10): 1963-1971, 2015.
Dou, Bin et al., Test Device Of Hi-Fi Simulation Thief Formation For Leakage Plugging Evaluation, China Petroleum Machnery, 37(11), 2009, 4 pages.
Wang, Qiang et al., An Experimental Investigation on Pressure Bearing and Tight Plugging of Fractured Formations in Deep and Ultra-deep Wells, Journal of Southwest Petroleum University (Science & Technology Edition), 43(4): 109-117, 2021.

* cited by examiner

300

```
┌─────────────────────────────────────────┐
│ Loading a simulated formation with a    │
│ simulated fracture in a simulated       │──310
│ wellbore, closing a second valve, and   │
│ turning on a mixing device              │
└─────────────────────────────────────────┘
                    ↓
┌─────────────────────────────────────────┐
│ Injecting a lost circulation material   │──320
│ into a mixing barrel through a liquid   │
│ injection port                          │
└─────────────────────────────────────────┘
                    ↓
┌─────────────────────────────────────────┐
│ Closing the liquid injection port and   │
│ turning on a heating device and         │
│ pressurizing through a plunger pump,    │──330
│ and when a pressure difference between  │
│ two ends of the simulated wellbore      │
│ reaches a pressure difference           │
│ threshold, stopping pressurizing        │
└─────────────────────────────────────────┘
                    ↓
┌─────────────────────────────────────────┐
│ Opening a second valve to establish a   │
│ plugging process, and if a plugging     │
│ zone is formed in the simulated         │──340
│ fracture and an outlet end has no       │
│ leakage, turning on the plunger pump    │
│ to continue pressurizing                │
└─────────────────────────────────────────┘
                    ↓
┌─────────────────────────────────────────┐
│ Collecting a fluid pressure change of   │
│ the simulated fracture during the       │──350
│ plugging process through a plurality    │
│ of first pressure sensors               │
└─────────────────────────────────────────┘
                    ↓
┌─────────────────────────────────────────┐
│ Calculating a pressure-bearing capacity │
│ of plugged fracture based on the fluid  │──360
│ pressure change                         │
└─────────────────────────────────────────┘
```

FIG. 3

FRACTURE PLUGGING SIMULATION EXPERIMENTAL DEVICE AND EXPERIMENTAL METHOD THEREOF

CROSS-REFERENCE TO RELATED APPLICATIONS

This application claims priority to Chinese Patent Application No. 202311264246.5, filed on Sep. 26, 2023, the entire contents of which are incorporated herein by reference.

TECHNICAL FIELD

The present disclosure relates to the technical field of oil and gas reservoir development, and in particular to a fracture plugging simulation experimental device and an experimental method thereof.

BACKGROUND

In line with the new trend of global oil and gas exploration and development, the exploration and development of oil and gas resources in China is gradually moving towards deep water, deep and unconventional oil and gas resources. The multi-scale fractures widely developed in deep formation provide a good flow channel for the efficient development of oil and gas resources, but at the same time, the extensive use of high-density drilling fluid also increases the risk of drilling fluid loss. Lost circulation in the drilling process not only causes high loss of drilling fluid materials and long non-production time, but also easily induces complex downhole accidents such as borehole collapse, blowout, and pipe sticking, and even leads to the completion of horizontal wells in advance in serious cases, which has become one of the main technical bottlenecks restricting the optimized fast drilling of fractured reservoirs. Pressure-bearing plugging technology is an effective means to control the loss of drilling fluid and improve the formation pressure-bearing capacity. In general, the pressure-bearing capacity of plugged fractures is used to measure the effect of controlling the drilling fluid loss and the strengthening degree of formation pressure-bearing capacity. The existing plugging simulation experiment can only test the pressure at both ends of the fractured specimen, but cannot obtain the fluid pressure change of the fractured specimen during the simulation experiment.

Therefore, the present disclosure provides a fracture plugging simulation experimental device and an experimental method thereof, which are capable of obtaining a nonlinear change in the fluid pressure during the plugging simulation experiment, providing an important technological support for the pressure-bearing plugging technology.

SUMMARY

One or more embodiments of the present disclosure provide a fracture plugging simulation experimental method, implemented using a fracture plugging simulation experimental device. The fracture plugging simulation experimental device may include a simulated wellbore. A simulated formation matching the simulated wellbore may be disposed in the simulated wellbore. A simulated fracture penetrating through an axial direction of the simulated formation may be disposed in the simulated formation. A plurality of first pressure sensors connected with a computer may be disposed on an inner wall surface of the simulated fracture. The plurality of first pressure sensors may be uniformly distributed along the axial direction and a radial direction of the simulated formation, and two ends of the simulated fracture may be provided with one of the plurality of first pressure sensors, respectively. An upper end of the simulated wellbore may be connected with a mixing barrel. A mixing device and a temperature sensor may be disposed in the mixing barrel. A liquid injection port and a pressurization port may be disposed at a top of the mixing barrel. The liquid injection port may be connected with a plugging fluid storage tank. The pressurization port may be connected with an output end of a plunger pump. A second pressure sensor and a first valve may be disposed on a pipeline between the pressurization port and the plunger pump in sequence. An input end of the plunger pump may be connected with a liquid storage barrel. A bottom end of the simulated wellbore may be connected with a liquid collection tank. A third pressure sensor and a second valve may be disposed on a pipeline between the simulated wellbore and the liquid collection tank. The liquid collection tank may be connected with the plugging fluid storage tank. The simulated wellbore and the mixing barrel may be connected with a heating device, respectively. The plugging simulation experimental method may comprise: loading the simulated formation with the simulated fracture in the simulated wellbore, closing the second valve and turning on the mixing device, injecting a lost circulation material into the mixing barrel through the liquid injection port, closing the liquid injection port and turning on the heating device and pressurizing through the plunger pump, when a pressure difference between two ends of the simulated wellbore reaches a pressure difference threshold, stopping pressurizing and open the second valve to establish a plugging process, and if a plugging zone is formed in the simulated fracture and an outlet end has no leakage, turning on the plunger pump to continue pressurizing, and collecting a fluid pressure change of the simulated fracture in the plugging process through the plurality of first pressure sensors; and calculating a pressure-bearing capacity of plugged fracture based on the fluid pressure change, the pressure-bearing capacity of plugged fracture being calculated by the following equations:

$$K_I = \sigma_h \sqrt{\pi L} F_\lambda(s) + P_w \sqrt{\pi L} \left[1 + (1-s)\left[0.5 + 0.743(1-s)^2\right]\right] + \frac{2\sqrt{L}(P_t - P_w)}{\sqrt{\pi}} \left(\arcsin\sqrt{\frac{2L - \Delta L}{2L}} - \arcsin\sqrt{\frac{\Delta L}{2L}} - \pi L\right) + \frac{2\sqrt{L}(B - P_w)}{\sqrt{\pi}} \left(\arcsin\sqrt{\frac{2L - \Delta L}{2L}} + \arcsin\sqrt{\frac{L-a}{2L}} - \arcsin\sqrt{\frac{L+a}{2L}} - \arcsin\sqrt{\frac{\Delta L}{2L}}\right) + \frac{Ae^{x_1}}{\sqrt{\pi L}} \left(\int_{-L+\Delta L}^{-a} e^x \sqrt{\frac{L+x}{L-x}} dx + \int_a^{L-\Delta L} e^x \sqrt{\frac{L+x}{L-x}} dx\right) \tag{1}$$

$$F_\lambda(s) = (1-\lambda)F_{o\lambda}(s) + \lambda F_1(s) \tag{2}$$

$$F_{o\lambda}(s) = 0.5(3-s)\left[1 + 1.243(1-s)^3\right] \tag{3}$$

$$F_1(s) = 1 + (1-s)\left[0.5 + 0.743(1-s)^2\right] \tag{4}$$

$$\lambda = \frac{\sigma_H}{\sigma_h} \tag{5}$$

$$s = \frac{L}{R+L} \tag{6}$$

$$P_t = \frac{\frac{w}{b}\frac{K_z}{K_i}P_w + \frac{2\Delta L}{I_d}P_i}{\frac{w}{b}\frac{K_z}{K_i} + \frac{2\Delta L}{I_d}} \tag{7}$$

-continued $$w = \frac{4(1-v^2)}{E}[P_w - \sigma_H + c(\sigma_H - \sigma_h)]\sqrt{(L+R)^2 - x^2} \quad (8)$$

$$A = \frac{P_w - P_t}{1 - e^{-a}}, B = \frac{P_t - P_w e^{-a}}{1 - e^{-a}} \quad (9)$$

wherein: $K_I$ denotes a mode 1 stress intensity factor at a fracture tip considering a plugging effect in MPa·m$^{0.5}$; On denotes the minimum horizontal principle stress in MPa; L denotes a fracture width in mm; $F_\lambda(s)$, $F_{o\lambda}(s)$, and $F_1(s)$ denote geometric coefficients and are dimensionless quantities; $P_w$ denotes a wellbore pressure in MPa; s denotes a ratio of a fracture length to a distance from the fracture tip to a center of a borehole, and is a dimensionless quantity; $P_t$ denotes a fluid pressure at the fracture tip in MPa; ΔL denotes a length of the fracture tip in mm; A and B denote intermediate coefficients, and are dimensionless quantities; a denotes a plugging position in mm, a=$x_1$−R; $x_1$ denotes a horizontal coordinate of one of ends of the plugging zone in mm; R denotes a radius of the borehole in mm; x denotes a horizontal coordinate of any position in a fracture length direction in mm; λ denotes a ratio of the maximum horizontal principle stress to the minimum horizontal principle stress, and is a dimensionless quantity; $\sigma_H$ denotes the maximum horizontal principle stress in MPa; w denotes a fracture width at the plugging position in mm; b denotes a length of the plugging zone in mm; $K_z$ denotes a permeability of the plugging zone in mD; $K_i$ denotes a permeability of the formation in mD; $I_d$ denotes a distance of a pressure decay at the fracture tip in mm; $P_i$ denotes an original formation pressure in MPa; v denotes the Poisson's ratio, and is a dimensionless quantity; E denotes an elasticity modulus of formation rock in GPa; and c denotes a coefficient related to the fracture length and the radius of the borehole.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein:

FIG. 3 is a flowchart illustrating an exemplary plugging simulation experimental method according to some embodiments of the present disclosure;

Figure 1:
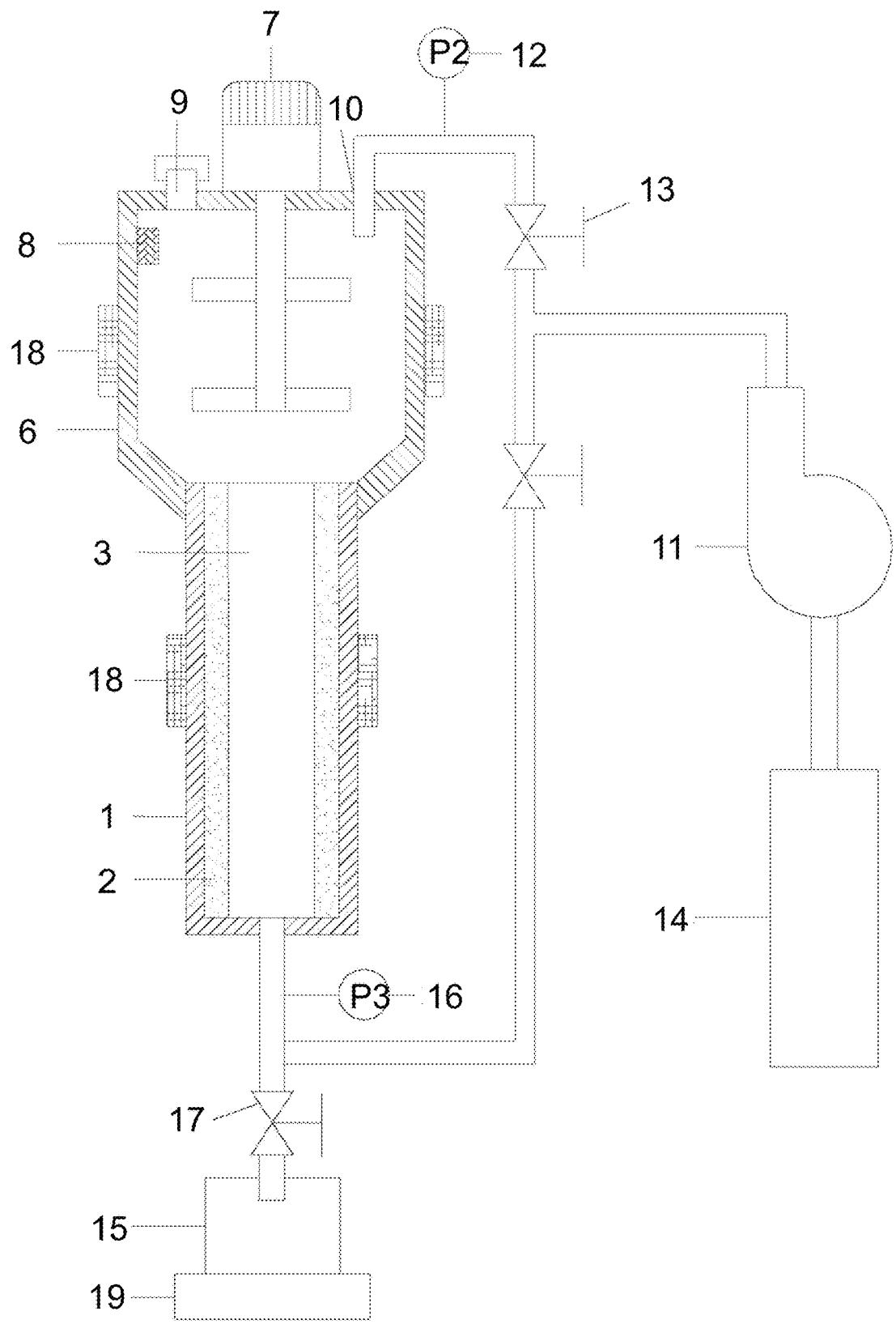
FIG. 1 is a schematic structural diagram illustrating an exemplary fracture plugging simulation experimental device according to some embodiments of the present disclosure.

Reference signs in the figure: 1—simulated wellbore, 2—simulated formation, 3—simulated fracture, 4—strain gauge, 5—first pressure sensor, 6—mixing barrel, 7—mixing device, 8—temperature sensor, 9—liquid injection port, 10—pressurization port, 11—plunger pump, 12—second pressure sensor, 13—first valve, 14—liquid storage barrel, 15—liquid collection tank, 16—third pressure sensor, 17—second valve, 18—heating device, 19—electronic scale.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device", "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one", "a", "an", "one kind", and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

FIG. 1 is a schematic structural diagram illustrating an exemplary fracture plugging simulation experimental device according to some embodiments of the present disclosure. The fracture plugging simulation experimental device provided by the embodiments of the present disclosure will be described in detail below. It should be noted that the following embodiments are used only for explaining the present disclosure and do not constitute a limitation to the present disclosure.

In some embodiments, as shown in FIG. 1, the fracture plugging simulation experimental device may include a simulated wellbore 1. A simulated formation 2 matching the simulated wellbore 1 may be disposed in the simulated wellbore 1. A simulated fracture 3 penetrating through an axial direction of the simulated formation 2 may be disposed in the simulated formation 2. A plurality of first pressure sensors connected with a computer may be disposed on an inner wall surface of the simulated fracture 3. The plurality of first pressure sensors may be uniformly distributed along the axial direction and a radial direction of the simulated formation 2. Two ends of the simulated fracture 3 may be provided with one of the plurality of first pressure sensors, respectively.

The axial direction of the simulated formation 2 refers to a direction along a central axis of the simulated formation 2 from an end close to a mixing barrel to an end close to an outlet of the simulated wellbore 1. The radial direction of the simulated formation 2 refers to a direction perpendicular to the axial direction of the simulated formation 2. The two ends of the simulated fracture 3 may include an end of the simulated fracture 3 close to the mixing barrel and an end close to the outlet of the simulated wellbore 1. The plurality of first pressure sensors may be provided on inner wall of the two ends of the simulated fracture 3, so as to ensure pressure measurement of the inlet and the outlet of the fracture.

The simulated wellbore 1 refers to a device used to simulate the structure of an actual oil and gas wellbore. In some embodiments, the simulated wellbore 1 may have a diameter, a length, an inner wall structure, etc., that is similar to or the same as a real wellbore. In some embodiments, an experimenter may simulate conditions such as a pressure and a fluid within the real wellbore in a laboratory environment using the simulated wellbore 1.

The simulated formation 2 refers to a structural layer used to simulate a subterranean rock layer and a soil layer. In some embodiments, the experimenter may simulate a real formation environment by changing characteristics of the simulated formation 2. For example, the characteristics of the simulated formation 2 may include at least one of a permeability, a porosity, a strength, and a composition.

In some embodiments, an outer diameter of the simulated formation 2 may be equal to an inner diameter of the simulated wellbore 1.

Figure 2:
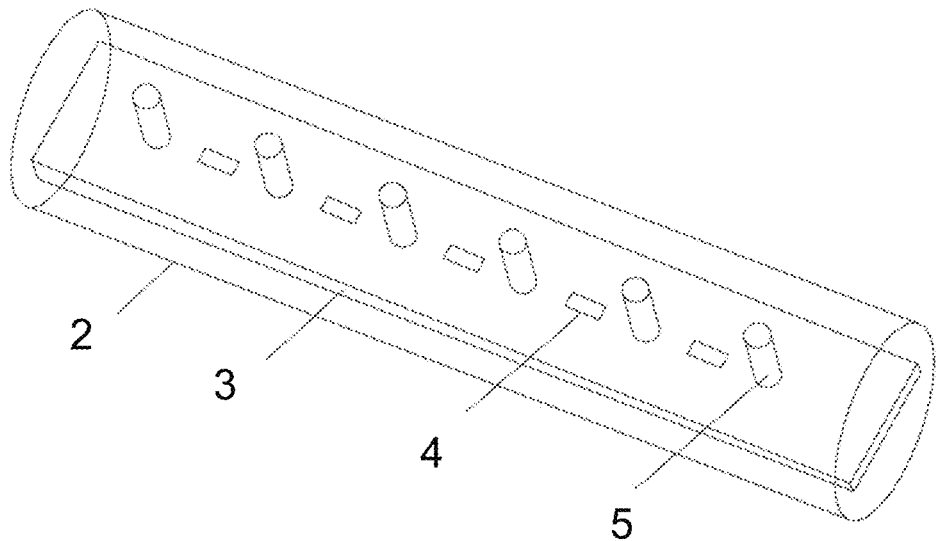
FIG. 2 is a schematic structural diagram illustrating a simulated formation according to some embodiments of the present disclosure.

In some embodiments, an inner surface of the simulated formation 2 may be one of a three-dimensional curved surface, a horizontal surface, a wedge-shaped surface, or other regular or irregular surface types. For example, the inner surface of the simulated formation 2 may be a horizontal plane, as shown in FIG. 1 and FIG. 2.

By setting the inner surface of the simulated formation to different shapes, different shapes of fractures generated in different scenarios may be simulated, which is applicable to an actual drilling process that generates different fractures.

The simulated fracture 3 refers to an artificially created fracture within the simulated formation. In some embodiments, the experimenter may simulate a fracture situation in the real formation by changing features of the simulated fracture 3. For example, the features of the simulated fracture 3 may include at least one of a shape, a size, or a distribution feature, or the like.

The plurality of first pressure sensors refer to devices for measuring a pressure change in the simulated fracture 3. In some embodiments, the plurality of first pressure sensors may be connected with a computer to transmit and record pressure data at different positions of the simulated fracture 3 in real time. In some embodiments, the plurality of the first pressure sensors may be uniformly distributed along an axial direction and a radial direction of the simulated fracture 3. The computer may be configured as a personal computer, a desktop computer, or a tablet computer, or the like. In some embodiments, a count of the plurality of first pressure sensors may be positively correlated with the size of the fracture. The larger the size of the fracture, the more the first pressure sensors can be provided. The count of the plurality of first pressure sensors may also be set based on experience or demand.

According to some embodiments of the present disclosure, by setting the plurality of first pressure sensors at the inner wall of the simulated fracture, the plurality of first pressure sensors may be distributed uniformly along the axial direction and the radial direction of the simulated formation, respectively, such that the nonlinear fluid pressure change of the fracture in the plugging process can be more accurately obtained, and the pressure-bearing capacity of plugged fracture more in line with the actual situation can be obtained according to the fluid pressure change, thereby providing important technical support for the pressure plugging technology.

In some embodiments, a plurality of strain gauges connected with the computer may be disposed on a wall surface of the simulated fracture. The plurality of strain gauges may be uniformly distributed along the axial direction and the radial direction of the simulated formation, respectively.

The plurality of strain gauges refer to sensitive elements used to measure a strain in an object. In some embodiments, the plurality of strain gauges may be configured to monitor small changes at different positions of the simulated fracture in case of an external pressure or deformation.

FIG. 2 is a schematic structural diagram illustrating a simulated formation according to some embodiments of the present disclosure. In some embodiments, a plurality of first pressure sensors 5 and a plurality of strain gauges 4 may be distributed on an inner wall of the simulated fracture 3 in the simulated formation 2 in a staggered, manner as shown in FIG. 2. In this way, mutual interference of measurement data by the plurality of the first pressure sensors 5 and the plurality of the strain gauges 4 can be avoided, thereby improving the measurement accuracy.

In some embodiments, as shown in FIG. 1, an upper end of the simulated wellbore 1 may be connected with a mixing barrel 6. A mixing device 7 and a temperature sensor 8 may be disposed in the mixing barrel 6. A liquid injection port 9 and a pressurization port 10 may be disposed at a top of the mixing barrel 6. The liquid injection port 9 may be connected to with plugging fluid storage tank (not shown in the figure). The pressurization port 10 may be connected with an output end of the plunger pump 11. A second pressure sensor 12 and a first valve 13 may be disposed on a pipeline between the pressurization port 10 and the plunger pump 11 in sequence. An input end of the plunger pump 11 may be connected with a liquid storage barrel 14.

The mixing barrel 6 refers to a barrel structure for mixing liquid or a lost circulation material.

The mixing device 7 refers to a device that agitates the liquid or the lost circulation material, such as a stirring rod. The stirring rod ensures that the plugging fluid or other fluid reaches a homogeneous state before being injected into the simulated wellbore.

The liquid injection port 9 may be configured to inject the liquid or the lost circulation material into the mixing barrel 6. The liquid may be mud or water. More descriptions regarding the lost circulation material may be found in the related descriptions below. The pressurization port 10 may be configured to pressurize the interior of the mixing barrel 6 and the interior of the simulated wellbore 1, to simulate a high-pressure environment.

In some embodiments, the fracture plugging simulation experimental device may further include a rotating mechanism. The rotating mechanism may be connected with the mixing barrel 6 and/or the simulated wellbore 1 to control a connected whole of the mixing barrel 6 and the simulated wellbore 1 to rotate and fix within 360°.

The rotating mechanism refers to a mechanical device used to realize the rotation of the object. The mixing barrel 6 and the simulated wellbore 1 may be an integrated structure. The rotating mechanism may control the mixing barrel 6 and the simulated wellbore 1 to rotate arbitrarily (e.g., 360° rotation) along the axial direction and the radial direction, and to be fixed in an arbitrary position, so as to simulate different situations during drilling, such as a situation where the wellbore is tilted. In this way, the fracture plugging simulation experimental device may simulate plugging situations in various scenarios, increasing the applicable scenarios of the fracture plugging simulation experimental device.

The temperature sensor 8 refers to a device used to record a temperature change within the mixing barrel 6. In some embodiments, the temperature sensor 8 may be connected with computer to transmit and record temperature data of the liquid within the mixing barrel in real time.

The plugging fluid storage tank refers to a container for storing the lost circulation material. In some embodiments, the plugging fluid storage tank may be connected with the liquid injection port of the mixing barrel to transfer the plugging fluid from the plugging fluid storage tank to the mixing barrel for mixing and preparation.

The plunger pump 11 refers to a pump for generating a high-pressure fluid. In some embodiments, the plunger pump 11 may be configured to inject liquid from the liquid storage barrel 14 into the mixing barrel 6 at high pressure to provide the high-pressure environment for a plugging simulation experiment. An input end of the plunger pump 11 refers to an end of the plunger pump 11 close to the liquid storage barrel 14. An output end of the plunger pump 11 refers to an end of the plunger pump 11 close to the first valve 13. The liquid in the liquid storage barrel 14 may enter the plunger pump 11 through the input end of the plunger pump 11, and may be pressurized by the plunger pump 11 and then outputted from the output end of the plunger pump 11 into the mixing barrel 6.

The first valve 13 refers to a device for controlling opening and closing of a fluid pipeline, and controlling an opening degree of the pipeline. The opening degree of the pipeline may be controlled by controlling the first valve 13, so as to control a flow rate of the fluid output from the plunger pump. The first valve 13 may also be used as a safety device to quickly close in the event of an abnormal situation (e.g., high pressure, pipeline rupture, or the like) to prevent fluid leakage and equipment damage, and ensure the safety of experimental personnel and equipment.

The second pressure sensor 12 may be configured to measure the pressure of an outlet pipe of the plunger pump. In some embodiments, the first valve 13 may be provided close to the plunger pump 11, and the second pressure sensor 12 may be provided close to the pressurization port 10, thereby ensuring that the pressure measured by the second pressure sensor 12 is the pressure of the liquid entering the mixing barrel 6.

The liquid storage barrel 14 refers to a device for storing the liquid. The liquid storage barrel 14 may be configured to store mud or water, or the like, which may be pumped into the simulated wellbore 1 by the plunger pump 11 to simulate drilling fluid, or the like, in the drilling process.

In some embodiments, as shown in FIG. 1, a bottom end of the simulated wellbore 1 may be connected with the liquid collection tank 15. A third pressure sensor 16 and a second valve 17 may be disposed on a pipeline between the simulated wellbore 1 and the liquid collection tank 15. The liquid collection tank 15 may be connected with the plugging fluid storage tank. The simulated wellbore 1 and the mixing barrel 6 may be connected with a heating device 18, respectively.

The liquid collection tank 15 refers to a container for collecting and storing the liquid. In some embodiments, the liquid collection tank may be configured to collect and store the liquid flowing out of the simulated wellbore 1.

In some embodiments, as shown in FIG. 1, the fracture plugging simulation experimental device may further include an electronic scale 19. The liquid collection tank 15 may be disposed on the electronic scale 19. A pipeline between the bottom end of the simulated wellbore 1 and the liquid collection tank 15 may be connected by a high pressure hose.

In some embodiments, the pipeline between the bottom end of the simulated wellbore 1 and the liquid collection tank 15 may also be connected by a rigid pipeline, such as a stainless steel pipe, a carbon steel pipe, or the like.

The electronic scale may be configured to record a weight change of the liquid collection tank. The weight change recorded by the electronic scale may reflect a cumulative fluid loss during the plugging process.

The third pressure sensor 16 refers to a device for measuring the pressure of a pipeline between the simulated wellbore 1 and the liquid collection tank 15.

The second valve 17 refers to a device for controlling flowing of the fluid. In some embodiments, the second valve 17 may be provided close to the liquid collection tank 15. The third pressure sensor 16 may be provided close to a lower end of the simulated wellbore 1. In some embodiments, when it is ready to observe the plugging effect after pressurization is completed, the second valve may be opened to enable the leakage fluid in the simulated wellbore to flow into the liquid collection tank.

The heating device 18 refers to a device for providing heat. In some embodiments, the heating device may be connected with the simulated wellbore and the mixing barrel for controlling or regulating the temperature within the simulated wellbore and the mixing barrel during the experiment. In some embodiments, the form of the heating device may include at least one of an electric heating element, a heating tube, a heating plate, or the like. The heating mode of the heating device may include at least one of current heating, heat conduction, or heat radiation, or the like.

In some embodiments, the fracture plugging simulation experimental device may further include a processor. The processor may be in communication connection with components of the fracture plugging simulation experimental device. In some embodiments, a processor 130 may be configured to process information and/or data related to the fracture plugging simulation experimental method to perform one or more functions described in the present disclosure. In some embodiments, the processor may include one of a microcontroller (MCU), an embedded processor, a graphics processing unit (GPU), or the like, or any combination thereof.

More descriptions regarding the fracture plugging simulation experimental device may be found in the related descriptions of Embodiment 1 below.

It should be noted that the above description of the fracture plugging simulation experimental device and the components thereof is provided only for descriptive convenience, and does not limit the present disclosure to the scope of the embodiments cited. It is understood that for a person skilled in the art, after understanding the principle of the device, it may be possible to arbitrarily combine various parts of the device or constitute sub-devices to be connected with other devices without departing from this principle.

FIG. 3 is a flowchart illustrating an exemplary fracture plugging simulation experimental method according to some embodiments of the present disclosure. The fracture plugging simulation experimental method may be implemented by a process 300 as shown in FIG. 3. The process 300 is an exemplary process of the fracture plugging simulation experimental device. The process 300 may include operations 310-360. In some embodiments, the fracture plugging simulation experimental method may be experimented with a fracture plugging simulation experimental device.

In 310, a simulated formation with a simulated fracture may be loaded in a simulated wellbore, a second valve may be closed, and a mixing device may be turned on.

All valves of the fracture plugging simulation experimental device may be closed before the experiment is started. At the beginning of the experiment, the simulated formation with the simulated fracture may be mounted either manually or by a mounting device (e.g., a robotic arm, etc.).

In 320, a lost circulation material may be injected into a mixing barrel through a liquid injection port.

The lost circulation material refers to a material that seals a fracture to prevent liquid leakage. For example, the lost circulation material may include a non-permeable agent, a chemical gel material, or the like.

In some embodiments, the lost circulation material may include rigid particles, elastic particles, or the like. The rigid particles may include a plurality of rigid particles of different particle sizes.

The rigid particles refer to materials used to enhance the strength of a plugging zone. The rigid particles do not expand when encountering the liquid and have a certain degree of rigidity. For example, the rigid particles may include calcite, etc. The elastic particles refer to materials suitable for enhancing the sealing performance of the plugging zone. The elastic particles may absorb the liquid to expand, thereby enhancing the sealing performance of the plugging zone. For example, the elastic particles may include expanded graphite, etc.

In some embodiments, the rigid particles may include the plurality of rigid particles of different particle sizes. For example, the rigid particles may include coarse particles with a particle size being within a range of 1-10 mm, medium particles with a particle size being within a range of 0.1-1 mm, and/or fine particles with a particle size being within a range of 0.01-0.1 mm. The rigid particles of different particle sizes may be mixed according to a preset ratio. The preset proportion may be preset based on experience or demand. The rigid particles of different particle sizes may be configured to fill in different gaps, thereby improving the overall compactness of the lost circulation material, reducing the infiltration channel, and enhancing the plugging effect. In some embodiments, the rigid particles may also include rigid particles of more particle sizes, which may be set according to demand.

In different plugging simulation experiments, at least one of a simulated fracture parameter of the simulated fracture 3, a simulated formation feature of the simulated formation 2, and a lost circulation material parameter may be different. More descriptions regarding the simulated fracture parameter, the simulated formation feature, and the lost circulation material parameter may be found in the present disclosure below.

In 330, the liquid injection port may be closed and a heating device may be turned on, pressurization may be performed through a plunger pump, and when a pressure difference between two ends of the simulated wellbore reaches a pressure difference threshold, pressurization may be stopped.

An operation parameter of the heating device may be preset based on experience. The operation parameter of the heating device may include heating power of the heating device, etc.

The pressure difference threshold refers to a minimum value of the pressure difference between the two ends of the simulated wellbore 1. In some embodiments, the pressure difference threshold may be set based on the experience or the experiment. In some embodiments, the set pressure difference threshold should be much lower than an actual pressure-bearing capacity of the simulated wellbore, so as to ensure the safety of the simulation experiment. More descriptions regarding the pressure difference threshold may be found in the related descriptions of Embodiment 2.

In some embodiments, the plunger pump 11 may implement pressurization by continuously pumping the liquid (e.g., mud or water) into the liquid storage barrel 14 and pressurizing, and delivering pressurized liquid to the mixing barrel 6, the pressurized liquid being stirred to flow into the simulated wellbore 1. When the processor detects that the pressure difference between the two ends of the simulated wellbore 1 is greater than or equal to the pressure difference threshold, the plunger pump 11 may be controlled to stop working, thereby stopping pressurization.

In 340, a second valve may be opened to establish a plugging process, and if a plugging zone is formed in the simulated fracture and no leakage occurs at an outlet end, the plunger pump may be turned on to continue pressurizing.

The plugging zone refers to a dense granular matter system formed within the simulated fracture. The outlet end of the simulated fracture refers to an end of the simulated fracture close to the liquid collection tank.

In some embodiments, the processor may determine that the simulated fracture has no leakage based on the fact that the measurement data of the electronic scale 19 has no change. The processor may turn on the plunger pump 11 to continue pressurizing based on the fact that the simulated fracture has no leakage until a change in the measurement data of the electronic scale 19 occurs, i.e., a leakage occurs in the simulated fracture, and then turn off the plunger pump 11.

In 350, a fluid pressure change of the simulated fracture during the plugging process may be collected through a plurality of first pressure sensors.

The variation of fluid pressure refers to a change of the fluid pressure in the simulated fracture over time and position. The processor may obtain a sequence of fluid pressures at different positions of the simulated fracture at multiple times through the plurality of the first pressure sensors 5 at different positions of the simulated fracture as the fluid pressure change. More descriptions regarding the plurality of first pressure sensors may be found in FIG. 1 and FIG. 2.

In 360, a pressure-bearing capacity of plugged fracture may be calculated based on the fluid pressure change.

The pressure-bearing capacity of plugged fracture may be used to reflect the pressure capacity of the plugging zone formed in the simulated fracture. In some embodiments, the pressure-bearing capacity of plugged fracture may be expressed in terms of a stress intensity factor for the simulated fracture, such as a type 1 stress intensity factor $K_I$. $K_I$ reflect an opening or tensioning stress of the fracture along a direction perpendicular to a fracture surface. The pressure-bearing capacity of plugged fracture may be positively correlated with the type 1 stress intensity factor $K_I$.

In some embodiments, the processor may calculate the pressure-bearing capacity of plugged fracture based on the fluid pressure change in various ways. For example, the processor may calculate the type 1 stress intensity factor $K_I$ based on the fluid pressure change by equation (1)-equation (9). More descriptions regarding the equation (1)-equation (9) may be found in Embodiment 3.

In some embodiments, the processor may also determine the pressure-bearing capacity of plugged fracture through a pressure bearing prediction model based on pressure data, strain data of a plurality of strain gauges, a set experimental parameter, and a lost circulation material parameter. More descriptions may be found in the related descriptions below.

More descriptions regarding the fracture plugging simulation experimental method may be found in Embodiment 3 below.

In some embodiments, the fracture plugging simulation experimental method may further include an operation of verifying the pressure-bearing capacity of plugged fractures, including: keeping the second valve 17 open, increasing the injection pressure of the plunger pump 11, and continuously pumping mud or water into the simulated wellbore 1 to establish a high-pressure environment; if the pressure of the high-pressure environment is less than or equal to the pressure-bearing capacity of plugging zone, no liquid flowing out of the bottom of the simulated wellbore 1, and if the pressure of the high-pressure environment is greater than the pressure-bearing capacity of plugging zone, liquid flowing out of the bottom of the simulated wellbore 1, thus the predicted pressure-bearing capacity of plugging zone is consistent with the real value. The operation of verifying the pressure-bearing capacity of plugging zone refers to an operation of verifying whether a predicted pressure-bearing capacity of plugging zone matches the real value. The predicted pressure-bearing capacity of plugging zone refers to a pressure difference between two ends of the plugging zone, which can be obtained by calculation or by a pressure-bearing prediction model. More descriptions may be found in the related descriptions of FIG. 3 and the related descriptions of the pressure-bearing capacity prediction model below. The actual pressure-bearing capacity of plugging zone refers to a pressure-bearing capacity of the simulated fracture when an actual plugging simulation experiment of the simulated fracture is performed. Since the simulated fracture is a rigid system, the pressure-bearing capacity of the simulated fracture is approximately equal to the pressure-bearing capacity of plugging zone. Thus the actual pressure-bearing capacity of plugging zone may be a pressure of the high-pressure environment when the liquid flows from the bottom of the simulated wellbore in the actual experimental process. It should be noted that if the simulated fracture is a rock material, the pressure-bearing capacity of the simulated fracture is equal to the pressure-bearing capacity of plugged fractures The pressure of the high-pressure environment may be obtained by the plurality of first pressure sensors 5 disposed at a tip of the simulated fracture.

In some embodiments, in response to determining that the pressure of the high-pressure environment is less than or equal to the pressure-bearing capacity of plugging zone, the liquid may flow out of the bottom of the simulated wellbore 1, which means that the predicted pressure-bearing capacity of plugging zone is greater than the real value. In some embodiments, in response to determining that the pressure of the high-pressure environment is greater than the pressure-bearing capacity of plugging zone, no liquid may flow out of the bottom of the simulated wellbore 1, which means the predicted pressure-bearing capacity of plugging zone is less than the real value.

More descriptions regarding verifying the fracture plugging simulation experimental method may be found in the related descriptions of Embodiment 4.

With the operation of verifying the pressure-bearing capacity of plugged fracture, whether the predicted plugging pressure-bearing capacity is accurate may be verified, so as to facilitate the experimenter to make adjustment to the relevant parameters when the prediction of the plugging pressure-bearing capacity is inaccurate, thereby ensuring the accuracy of the predicted plugging pressure-bearing capacity.

In some embodiments, the fracture plugging simulation experimental method may further include an operation of testing a backflow capacity of the lost circulation material, including: connecting an output end of a pipeline of the plunger pump 11 with an output pipeline at the bottom of the simulated wellbore 1, reversely injecting mud or water into the simulated wellbore 1 through the plunger pump 11, and calculating a backflow quantity of the lost circulation material through a pressure change or a discharge volume of the simulated wellbore 1.

The operation of testing the backflow capacity is to test the ability of the fracture plugging simulation experimental device to discharge the backflow lost circulation material from the simulated fracture out of the device at the end of the experiment.

The pressure change refers to simulating a pressure change in the simulated wellbore during a backflow process, such as a pressure change rate or change value. In some embodiments, the processor may obtain the change value of the pressure change in the simulated wellbore 1 based on the plurality of first pressure sensors 5. The backflow quantity may be positively correlated with the change value of the pressure change or the discharge volume. The discharge volume refers to a volume of fluid discharged in a reverse direction from the simulated wellbore 1 during the test of the backflow capacity, i.e., the volume of fluid discharged from the end of the simulated wellbore close to the mixing barrel into the mixing barrel. In some embodiments, the processor may obtain the pressure change value of the second pressure sensor 12 during the backflow test, and determine the discharge volume based on the pressure change value of the second pressure sensor. The discharge volume may be positively correlated with the pressure change value of the second pressure sensor.

The backflow capacity of the lost circulation material refers to the ability of the lost circulation material to be discharged out of the wellbore in the reverse direction. During the test, the first valve 13 and the second valve 17 may be closed to prevent waste of the fluid and prevent affecting the test result of the backflow capacity.

More descriptions regarding the fracture plugging simulation experimental method may be found in Embodiment 5.

More descriptions regarding the fracture plugging simulation experimental device and the components thereof may be found in FIG. 1 and FIG. 2.

With the operation of testing the backflow capacity of the lost circulation material, the capacity of the fracture plugging simulation experimental device to backflow the lost circulation material may be tested. If the backflow capacity does not meet the requirements, experimenter may check and repair the fracture plugging simulation experimental device in time to avoid affecting the subsequent experiment.

It should be noted that the foregoing descriptions of the fracture plugging simulation experimental device and the experimental method thereof are for the purpose of example and illustration only and do not limit the scope of application of the present disclosure. For those skilled in the art, various corrections and changes can be made to the fracture plugging simulation experimental device and the experimental method thereof under the guidance of the present disclosure. However, such corrections and changes remain within the scope of the present disclosure, such as changing the type of the lost circulation material, etc.

In some embodiments, the processor may determine the lost circulation material parameter and the set experimental parameter based on the simulated fracture parameter of the simulated fracture and the simulated formation feature of the simulated formation.

The simulated fracture parameter refers to a parameter related to the simulated fracture. For example, the simulated fracture parameter may include at least one of an inner diameter, a height, or the like, of the simulated fracture.

The simulated formation feature may be used to reflect characteristics of different simulated formations. In some embodiments, the simulated formation feature may include a type of an inner surface of the simulated formation. For example, the type of inner surface of the simulated formation may include a three-dimensional curved surface, a horizontal surface, a wedge-shaped surface, etc.

In some embodiments, the processor may obtain the simulated fracture parameter and the simulated formation feature uploaded by the user based on a user terminal. The user terminal may be a computer or a mobile phone, or the like. The computer may be found in the related descriptions of in FIG. 1.

The lost circulation material parameter refers to a parameter related to the lost circulation material used in the plugging simulation experiment. For example, the lost circulation material parameter may include a type of the lost circulation material, a range of a particle size, a proportion of different types of lost circulation materials, or the like. The type of lost circulation material may include the rigid particles, the elastic particles, or the like.

The set experimental parameter refers to a set value of a relevant operation parameter that needs to be achieved for the simulation experiment. For example, the set experimental parameter may include at least one of a set pressure difference threshold at two ends of the simulated wellbore, a set temperature of the simulated fracture, a set rotational speed of the rotating mechanism, or the like.

In some embodiments, the processor may determine the lost circulation material parameter and the set experimental parameter based on the simulated fracture parameter and the simulated formation feature in various ways. For example, the processor may look up a preset comparison table based on the simulated fracture parameter and the simulated formation feature and determine the lost circulation material parameter by interpolation or fitting. The preset comparison table may include a mapping relationship between the simulated fracture parameter and the simulated formation feature, and the lost circulation material parameter. The mapping relationship may be obtained based on the experiment or may be set by those skilled in the art based on historical experience. With application of the preset comparison table and the interpolation or fitting method, unmeasured or uncalculated point positions of the simulated fracture may be estimated, thereby reducing the amount of data needed to construct the preset comparison table, and obtaining more suitable lost circulation material parameter.

As another example, after the lost circulation material parameter is determined, the processor may construct a first feature vector based on the simulated fracture parameter, the simulated formation feature, and the lost circulation material parameter, look up, in the first vector database, a first reference vector having the smallest vector distance from the first feature vector, take a reference set experiment parameter corresponding to the first reference vector as the set experimental parameter corresponding to the first feature vector. The first vector database may include a plurality of first reference vectors and corresponding reference set experimental parameters. The first vector database may be constructed based on historical data in a historical simulation experiment. For example, the first reference vector may be constructed based on a historical simulated fracture parameter, a historical simulated formation feature, and a historical lost circulation material parameter. The vector distance may be a cosine distance, a European distance, or the like.

In some embodiments, the reference set experimental parameter of the first vector database may be determined based on the result of the operation of verifying the pressure-bearing capacity of plugged fracture during the plugging simulation experiment. More descriptions regarding the operation of verifying the pressure-bearing capacity of plugged fracture may be found in the present disclosure below.

For example, if the verification result is that the pressure-bearing capacity of plugged fracture is consistent with the actual pressure-bearing capacity of plugged fracture, the historical experimental setup parameter corresponding to the historical plugging simulation experiment will be used as the reference experimental setup parameter.

In some embodiments, in response to the verification result that the pressure-bearing capacity of plugged fracture is greater than the real value, the historical set experimental parameter may be reduced, such as reducing at least one of the set pressure difference threshold at the ends of the simulated wellbore, the set temperature of the simulated fracture, the set rotational speed of the rotating mechanism, or the like, and a reduced historical set experimental parameter may be taken as a reference set experimental parameter. In response to the verification result that the pressure-bearing capacity of plugged fracture is greater than the real value, it is indicated that the pressure-bearing capacity of plugged fracture of the current lost circulation material may not be able to withstand high temperature or high pressure, the reduced historical set experimental parameter may be taken as the reference set experimental parameter to reduce the set temperature or the set rotational speed in the next round of experiments, thereby obtaining a more suitable set temperature.

In response to the verification result that the pressure-bearing capacity of plugged fracture is less than the real value, an increased historical set experimental parameter may be used as the reference set experimental parameter. For example, the set temperature may be increased, the set rotational speed may be increased, and the set pressure difference threshold may be increased. The increased set temperature and the increased set rotational speed may be used in the next round of experiment to obtain whether the current lost circulation material is applied to a higher rotational speed and a higher temperature. The experimental time may be reduced by increasing the set pressure difference threshold.

The next round of experiment may be performed in accordance with the set experimental parameter obtained in the previous section, and the set experimental parameter may be adjusted in accordance with the result of the verification operation of the next round of experiment in the same way as described above, and so on.

In some embodiments, the first vector database may be continually updated based on data from each plugging simulation experiment.

The set experimental parameter may be adjusted through the result of the verification operation of the plugging simulation experiment can obtain the most suitable set experimental parameter corresponding to the current lost circulation material parameter. That is, the ideal set experimental parameter may be preset for different lost circulation material parameters, simulated fracture parameters, and simulated formation features; and the ideal set experimental parameter may be verified and adjusted through the next round of experiment, thereby making full use of each simulation experiment and avoiding ineffective experiment.

For example, different particle sizes of the lost circulation material parameter may be suitable for different inner widths of fractures. When the fracture is small but the lost circulation material has a large particle size, the lost circulation material may be located only at the mouth of the fracture and does not completely fill in the fracture (lull us into a false sense of sealing). In this case, even if the experiment is carried out, the actual pressure-bearing capacity obtained from the experiment may be very small, and cannot meet the demand for plugging.

In some embodiments, a plurality of temperature sensors may be provided in the simulated fracture. The plurality of the temperature sensors in the simulated fracture may be configured to obtain temperature data of the simulated fracture.

In some embodiments, the processor may determine an experimental simulation degree based on the pressure data and the temperature data; update operation parameters of the plunger pump, the heating device, and the rotating mechanism based on the experimental simulation degree; control the plunger pump, the heating device, and the rotating mechanism to operate based on updated operation parameters until the experimental parameters reach the set experimental parameter.

The pressure data refers to pressure data of the simulated fracture obtained by the plurality of first pressure sensors during the plugging process.

The experimental simulation degree is used to reflect a degree of uniformity of a relevant parameter change in the plugging simulation experiment. In some embodiments, the experimental simulation degree may include a pressure simulation degree, a temperature simulation degree, or the like. The pressure simulation degree may reflect a relative uniformity of pressure rise. The temperature simulation degree may reflect a relative uniformity of temperature rise. The pressure simulation degree and the temperature simulation degree may be expressed in terms of grade or percentage. In a real plugging process, the temperature of the fracture may be an ambient temperature of the formation, and the temperature may be relatively stable. When the width of the fracture is constant, the real pressure may gradually increase with the addition of drilling fluid. The pressure may also gradually increase with a gradual decrease in the width of the fracture.

In some embodiments, the processor may determine a pressure change magnitude at a plurality of positions of a plurality of simulated fractures based on the pressure data. In response to determining that the pressure change magnitude is consistent with the change in the simulated fracture, the pressure simulation degree may be high, or the pressure simulation degree may be low. The change in the simulated fracture may include a change in the size of the simulated fracture in a radial direction, such as a change in an inner width of the simulated fracture from near the mixing barrel to near the second valve.

For example, if the simulated fracture 3 is divided into three segments, and the inner width of the simulated fracture 3 gradually decreases from near the mixing barrel to near the second valve 17, the increase in the pressure may match the change in the inner width of the simulated fracture 3.

If the simulated fracture 3 is divided into n segments according to the length, each segment may have the same length, and the increase in the inner width of the simulated fracture in the adjacent segments may be the same. For example, the inner width of a simulated fracture $A_1$ segment may be denoted as nx, the inner width of an $A_2$ segment may be denoted as (n−1)x, . . . , and the inner width of an $A_n$ segment may be denoted as x. According to Poiseuille law, etc., as the liquid flows through the fracture segment by segment, the pressure at the end of each segment of the simulated fracture may decrease, and the magnitude of the decrease may be determined by the geometric size of each segment of simulated fracture and the fluid properties of the liquid. That is to say, the pressure at the end of the segments $A_1$-$A_n$ of the simulated fracture may decrease gradually.

For example, a sequence $\{(A_1, a_1), (A_2, a_2) \ldots (A_n, an)\}$ may represent the change in the pressure data of the segments $A_1$-$A_n$ of the simulated fracture. The pressure change magnitude may be represented by a sequence $\{(b_1, b_2 \ldots b_{n-1})\}$. $b_{n-1}$ denotes a difference between $a_n$ and $a_{n-1}$. If $b_1, b_2 \ldots b_{n-1}$ are equal and in accordance with a theoretical increment, the pressure simulation may be high. For example, the the pressure simulation may be 100%. Ff $b_1, b_2 \ldots b_{n-2}$ are equal in absolute value and the absolute value of $b_{n-1}$ is greater than the absolute value of the remaining difference, the pressure simulation may be low. For example, the pressure simulation may be 60%. The theoretical increment may be calculated by the pressure change, the inner width of the simulated fracture and the change of the inner width, the fluid properties of the liquid.

In some embodiments, the processor may obtain the temperature data measured by the plurality of temperature sensors in the simulated fracture at multiple time, and count statistical values of temperature data corresponding to the plurality of the temperature sensors; and determine the temperature simulation degree based on the statistical values. The statistical values may include a standard deviation, or the like. For example, the larger the standard deviation of the temperature data corresponding to the plurality of the temperature sensors, the more discrete the temperature data, the worse the temperature simulation. More descriptions regarding the plurality of temperature sensors in the simulated fracture may be found in the related descriptions above.

In some embodiments, the processor may obtain the experimental simulation degree by calculating based on the pressure simulation degree and the temperature simulation degree. The experimental simulation degree may be positively correlated with the pressure simulation degree and the temperature simulation degree. For example, the processor may obtain the experimental simulation degree based on the pressure simulation degree and the temperature simulation degree by calculating through equation (12) below:

Experimental simulation degree=$k1$×pressure simulation degree+$k2$×temperature simulation degree    (12)

Wherein, k1, k2 denote coefficients greater than 0, and k1, k2 may be preset based on experience or demand. For example, if the pressure fluctuation is unfavorable to the formation of plugging, indicating a higher pressure simulation degree, k1 may be set to be greater than k2.

The operation parameters refer to operating parameters of equipment related to the fracture plugging simulation experimental device, such as a pressurization amplitude of a single pressurization of the plunger pump, the heating power of the heating device, the rotational speed of the rotating mechanism, or the like.

In some embodiments, the processor may update the operation parameters based on the experimental simulation degree in various ways. For example, the processor may update the operation parameters based on the experimental simulation degree by preset rules; controlling the plunger pump, the heating device, and the flip mechanism to operate based on updated operating parameters until the set experimental parameter is reached.

For example, if the experimental simulation degree is lower than a simulation threshold, the updating the operation parameters may include lowering the rotational speed of the rotating mechanism, the pressurization amplitude of the single pressurization of the plunger pump, and the heating power of the heating device. The plunger pump may operate based on an updated pressurization amplitude of the single pressurization, the heating device may operate based on updated heating power, and the rotating mechanism may operate based on an updated rotational speed until the set experimental parameter is reached. The simulation threshold may be set based on experience. More descriptions regarding the set experimental parameter may be found in the present disclosure above.

As another example, if the experimental simulation degree is higher than the simulation threshold, updating the operation parameters may include increasing the rotational speed of the rotating mechanism, the pressurization amplitude of the single pressurization of the plunger pump, and the heating power of the heating device.

By determining the experimental simulation degree and adjusting the operation parameters based on the experimental simulation degree, the change magnitude of the operation parameters can be reduced in the case of a low experimental simulation degree, i.e., when the temperature change and the pressure change of the simulated fracture are not homogeneous, such that the temperature change and the pressure change of the simulated fracture are more uniform, and the simulated fracture is closer to the real situation. When the experimental simulation degree is good, the increase rate of the operation parameters increases, which can quickly reach the set experimental parameter and reduce the experimental time. By adjusting the operation parameters, the temperature and the pressure can be adjusted in real time, ensuring that the pressure and temperature distribution of the fracture lost circulation material is relatively uniform (e.g., uniform fracture change at different positions of the fracture), so as to fully simulate the real plugging process.

In some embodiments, the processor may determine the pressure-bearing capacity of plugged fracture through a pressure bearing prediction model based on pressure data, strain data of strain gauges, the set experimental parameter, and the lost circulation material parameter.

The pressure bearing prediction model refers to a model that predicts the pressure-bearing capacity of the simulated fracture. In some embodiments, the pressure bearing prediction model may be a machine learning model, such as a neural networks (NN) model, a deep neural networks (DNN) model, or the like, or any one or combination of other models.

The strain data refers to strain data of the simulated fracture measured by the strain gauges, such as a strain value, or the like. More descriptions regarding the pressure-bearing capacity of plugged fracture may be found in the related descriptions of FIG. 3. More descriptions regarding the pressure data, the set experimental parameter, and the lost circulation material parameter may be found in the present disclosure above.

In some embodiments, the pressure bearing prediction model may be obtained by training through a large number of training samples and labels corresponding to the training samples. In some embodiments, the plurality of training samples with the labels may be input into an initial pressure bearing prediction model. A loss function may be constructed from the labels and results of the initial pressure bearing prediction model. Parameters of the initial pressure bearing prediction model may be iteratively updated based on the loss function by gradient descent or other methods. When a preset condition is met, the model training may be completed, and a trained pressure bearing prediction model may be obtained. The preset condition may be that the loss function converges, a count of iterations reaches a threshold, or the like.

Each set of training samples of the training samples may include sample pressure data, sample strain data, sample set experimental parameters, and sample lost circulation material parameters in sample data. The training samples may be obtained from historical experimental data. The labels corresponding to the training samples may include sample pressure-bearing capacity of plugged fracture corresponding to each set of training samples. The labels may be determined by the pressure of the high-pressure environment when the fluid flows out in the operation of verifying the pressure-bearing capacity of plugged fracture in the plugging simulation experiment corresponding to the training samples. The higher the pressure of the high-pressure environment, the better the sample pressure-bearing capacity of plugged fracture. For example, an actual pressure of the high-pressure environment when the fluid flows out may be used as the sample pressure-bearing capacity of plugged fracture.

The pressure-bearing capacity of plugged fracture of the simulated fracture may be predicted by the pressure bearing prediction model, such that a reasonable pressure-bearing capacity of plugged fracture can be determined while saving resources and improving the prediction efficiency. Meanwhile, the prediction accuracy of the pressure-bearing capacity of plugged fracture can be improved.

In some embodiments, the processor may determine, based on the lost circulation material parameter, at least one set of training samples and labels corresponding to the at least one set of training samples in the training of the pressure bearing prediction model; and perform alternate training based on the at least one set of training samples. A learning rate of the alternate training based on the at least one set of training samples may be different learning. The learning rate may be determined based on training sample features.

The set of training samples refers to a dataset that includes a plurality of training samples. In some embodiments, the processor may use a plurality of training samples corresponding to historical data with the same particle size in the lost circulation material parameter as one set of training samples. For example, the processor may use a plurality of training samples corresponding to the historical data with a particle size of being within a range of 1-10 mm as one set of training samples. The plurality of labels corresponding to the plurality of samples of the set of training samples in the historical data may be used as labels for the set of training samples. In some embodiments, the processor may use the training samples corresponding to the historical data in the lost circulation material parameter with the same proportion of different types of lost circulation materials as one set of training samples. The historical data refers to data generated in the historical plugging simulation experiment. The historical data may include historical pressure data, historical strain data, a historical set experimental parameter, and a historical lost circulation material parameter, as well as the pressure of the high-pressure environment during a historical verification operation.

The alternate training refers to selecting the set of training samples in sequence for multiple rounds of training. In each round of training, one set of training samples may be selected for training based on the training samples in the set of training samples and corresponding labels, and the above operation may be repeated until all sets of training sample are trained. More descriptions regarding the specific training process may be found in the related descriptions above.

The learning rate refers to a step size in each iterative update of weight during the training process of the pressure bearing prediction model. The learning rate may determine an update amplitude of each weight in a gradient direction. Training may be unstable if the learning rate is set too large, or very slow if the learning rate is set too small. Setting the appropriate learning rate may make the neural network converge quickly and obtain an optimal solution, which improves the accuracy of the pressure bearing prediction model.

The training sample features may be used to reflect characteristics of the set of training samples. For example, the training sample features may include a range of the set experiment parameter of the set of training samples, such as a range of the set pressure difference threshold, a range of the set temperature, or the like. The smaller the range of the set pressure difference threshold, the more concentrated the pressure difference threshold. The smaller the range of the set temperature, the more concentrated the set temperature, and the more similar the plugging of the simulated fracture corresponding to the set of training samples.

In some embodiments, the processor may determine the learning rate for the set of training samples based on the training sample features of the set of training samples in various ways.

In some embodiments, for one set of training samples, the processor may and determine a statistical value by performing statistics on the set experimental parameter corresponding to each of the training samples in the set of training samples; and determine the learning rate corresponding to the set of training samples based on the statistical value. The statistical value may include, for example, a variance or a interquartile range, etc. The interquartile range refers to distance between a third quartile and a first quartile of a plurality of set experimental parameters included in the set of training samples. For example, the variance or the interquartile distance of the plurality of set pressure difference thresholds of the set of training sample sets may be counted, and the higher the variance or interquartile distance, the more dispersed the data is, and the lower the corresponding learning rate can be preset; and the smaller the variance or interquartile distance, the more centralized the data, the higher the corresponding learning rate can be preset.

In some embodiments, the training sample features may include a reliability of the training samples. The reliability of the training samples may be used to reflect the consistency of the labels corresponding to training samples that are the same or similar. For example, if a plurality of labels corresponding to a plurality of training samples in the set of training samples are consistent or mostly consistent, the reliability of the training samples may be high and the training effect is good; if a plurality of labels corresponding to a plurality of training samples are not consistent, i.e., the training samples are the same but correspond to different actual pressurization conditions, the reliability of the training samples may be low and the training effect may be poor.

In some embodiments, the processor may determine the reliability of the training samples based on the statistical value of the labels corresponding to the plurality of training samples in the same set of training samples. The statistical value may include the variance. For example, the smaller the variance of the labels corresponding to the plurality of training samples, the greater the reliability of the training samples.

In some embodiments, for one set of training samples, the processor may construct a second feature vector based on the training sample features, and look up at least one second reference vector in the second vector database that has a vector distance from the second feature vector that is less than a preset distance threshold. At least reference learning rate corresponding to the at least one second reference vector may be used as the learning rate or learning rate sequence data corresponding to the second feature vector. The second feature vector may include a range of set experimental parameters corresponding to the set of training samples, reliability of the training samples, or the like. The second vector database may include a plurality of second reference vectors and corresponding reference learning rates. The second vector database may be constructed based on historical data. For example, the plurality of second reference vectors may be constructed based on historical training sample features.

With the same lost circulation material parameter, the simulated fracture parameter and the simulated formation feature may be similar, and the set of training samples may be classified according to the lost circulation material parameter, such that the reliability and stability of the pressure bearing prediction model can be improved. In the same set of training sample, if the set pressure difference threshold and the set temperature are relatively centralized, the learning rate may be larger, thus reducing the training time. If the set pressure difference and the set temperature are relatively dispersed, the learning rate may be set to be smaller, thus improving the stability of model training.

The present disclosure is further described below with reference to the accompanying drawings and embodiments. It should be noted that the embodiments and the technical features in the embodiments in the present disclosure can be combined with each other without conflict. Unless otherwise defined, technical terms or scientific terms disclosed herein shall have the ordinary meaning as understood by a person of ordinary skill in the art to which the present disclosure belongs. The present disclosure discloses the use of the words "including" or "comprising" and other similar words to mean that the components or objects appearing before the word cover the components or objects appearing after the word and their equivalents, and do not exclude other components or objects.

Embodiment 1

As shown in FIGS. 1-2, a fracture plugging simulation experimental device includes the simulated wellbore 1. The simulated formation 2 matching the simulated wellbore 1 is disposed in the simulated wellbore. The simulated fracture 3 penetrating through an axial direction of the simulated formation 2 is disposed in the simulated formation 2. An inner surface of the simulated formation 2 is one of a three-dimensional curved surface, a horizontal surface, and a wedge-shaped surface. A plurality of first pressure sensors 5 connected with a computer (not shown in the figure) are disposed on an inner wall surface of the simulated fracture 3. The plurality of first pressure sensors 5 are uniformly distributed along the axial direction and a radial direction of the simulated formation 2, and two ends of the simulated fracture 3 are provided with one of the plurality of first pressure sensors 5, respectively. An upper end of the simulated wellbore 1 is connected with the mixing barrel 6. The mixing device 7 and the temperature sensor 8 are disposed in the mixing barrel 6. The liquid injection port 9 and the pressurization port 10 are disposed at a top of the mixing barrel 6. The liquid injection port 9 is connected with a plugging fluid storage tank (not shown in the figure). The pressurization port 10 is connected with an output end of the plunger pump 11. The second pressure sensor 12 and the first valve 13 are disposed on a pipeline between the pressurization port 10 and the plunger pump 11 in sequence, and an input end of the plunger pump 11 is connected with a liquid storage barrel. Mud or water is stored in the liquid storage barrel 14. A bottom end of the simulated wellbore 1 is connected with the liquid collection tank 15. The liquid collection tank 15 is disposed on the electronic scale 19, which measures the amount of loss during the plugging process through the electronic scale 19. The third pressure sensor 16 and the second valve 17 are disposed on a pipeline between the simulated wellbore 1 and the liquid collection tank 15. The liquid collection tank 15 is connected with the plugging fluid storage tank. The simulated wellbore 1 and the mixing barrel 6 are connected with the heating device 18, respectively.

In a specific embodiment, a plurality of strain gauges 4 connected with computer are also provided on the wall surface of the simulated fracture 3. The plurality of strain gauges 4 are uniformly distributed along the axial and radial directions of the simulated formation 2.

In a specific embodiment, the simulated wellbore 1 and the mixing barrel 6 are integrally formed. An outer diameter the mixing barrel 6 is greater than an outer diameter of the simulated wellbore 1, and the bottom of the mixing barrel 6 is connected to the top of the simulated wellbore 1 through a round table segment.

In a specific embodiment, a pipeline between the bottom end of the simulated wellbore 1 and the liquid collection tank 15 is connected by a high pressure hose, and an output end of the high pressure hose extends into the liquid collection tank 15, which is capable of avoiding splashing of the liquid when the second valve 17 is opened.

In another specific embodiment, the fracture plugging simulation experimental device further includes a rotating mechanism (not shown in the figure). The rotating mechanism is connected with the mixing barrel 6 to control a connected whole of the mixing barrel 6 and the simulated wellbore 1 to rotate and fix within 360°. The rotating mechanism is prior art, and the specific structure is not repeated here.

Embodiment 2

A fracture plugging simulation experimental method comprises: loading the simulated formation 2 provided with the simulated fracture 3 in the simulated wellbore 1, closing the second valve 17 and opening the mixing device 7, injecting a lost circulation material into the mixing barrel 6 through the liquid injection port 9, wherein the lost circulation material includes rigid particles (calcite) and elastic particles (expanded graphite), and the rigid particles include a plurality of rigid particles of different particle sizes; turning on the heating device 18 after closing the liquid injection port 9, and pressurizing through the plunger pump 11, stopping the pressurization when a pressure difference between two ends of the simulated wellbore 1 reaches a pressure difference threshold, opening the second valve 17 to establish a plugging process, if a plugging zone is formed in the fracture and no liquid flows out of an outlet end, turning on the plunger pump 11 to continue pressurizing, and collecting a fluid pressure change of the simulated fracture 3 in the plugging process through the plurality of first pressure sensors 5.

It should be noted that the pressure difference threshold is a manually set value. In a specific embodiment, the pressure difference threshold is 1.0 MPa.

Embodiment 3

A method for predicting a pressure-bearing capacity of a fracture in rock formations, comprising: conducting a plugging simulation experiment using the method of Embodiment 2, obtaining a fluid pressure change of the simulated fracture 3 during the plugging process; calculating the pressure-bearing capacity of a lost circulation material through a fractured formation plugging pressure-bearing capacity prediction model based on the collected fluid pressure data, the model for predicting the pressure-bearing capacity of plugged fractures can be expressed as:

$$K_I = \sigma_h \sqrt{\pi L} F_\lambda(s) + P_w \sqrt{\pi L} \left[1 + (1-s)\left[0.5 + 0.743(1-s)^2\right]\right] + \frac{2\sqrt{L}(P_t - P_w)}{\sqrt{\pi}} \left(\arcsin\sqrt{\frac{2L - \Delta L}{2L}} - \arcsin\sqrt{\frac{\Delta L}{2L}} - \pi L\right) + \frac{2\sqrt{L}(B - P_w)}{\sqrt{\pi}} \left(\arcsin\sqrt{\frac{2L - \Delta L}{2L}} + \arcsin\sqrt{\frac{L - a}{2L}} - \arcsin\sqrt{\frac{L + a}{2L}} - \arcsin\sqrt{\frac{\Delta L}{2L}}\right) + \frac{Ae^{x_1}}{\sqrt{\pi L}} \left(\int_{-L+\Delta L}^{-a} e^x \sqrt{\frac{L + x}{L - x}} dx + \int_a^{L - \Delta L} e^x \sqrt{\frac{L + x}{L - x}} dx\right) \tag{1}$$

$$F_\lambda(s) = (1 - \lambda) F_{o\lambda}(s) + \lambda F_1(s) \tag{2}$$

$$F_{o\lambda}(s) = 0.5(3 - s)\left[1 + 1.243(1 - s)^3\right] \tag{3}$$

$$F_1(s) = 1 + (1 - s)\left[0.5 + 0.743(1 - s)^2\right] \tag{4}$$

$$\lambda = \frac{\sigma_H}{\sigma_h} \tag{5}$$

$$s = \frac{L}{R + L} \tag{6}$$

$$P_t = \frac{\frac{w}{b}\frac{K_z}{K_i}P_w + \frac{2\Delta L}{I_d}P_i}{\frac{w}{b}\frac{K_z}{K_i} + \frac{2\Delta L}{I_d}} \tag{7}$$

$$w = \frac{4(I - v^2)}{E}[P_w - \sigma_H + c(\sigma_H - \sigma_h)]\sqrt{(L + R)^2 - x^2} \tag{8}$$

$$A = \frac{P_w - P_t}{1 - e^{-a}}, B = \frac{P_t - P_w e^{-a}}{1 - e^{-a}} \tag{9}$$

wherein: $K_I$ denotes a mode 1 stress intensity factor at a fracture tip considering a plugging effect in MPa·m$^{0.5}$; $\sigma n$ denotes the minimum horizontal principle stress in MPa; L denotes a fracture width in mm; $F_\lambda(s)$, $F_{o\lambda}(s)$, and $F_1(s)$ denote geometric coefficients and are dimensionless quantities; $P_w$ denotes a wellbore pressure in MPa; s denotes a ratio of a fracture length to a distance from the fracture tip to a center of a borehole, and is a dimensionless quantity; $P_t$ denotes a fluid pressure at the fracture tip in MPa; ΔL denotes a length of the fracture tip in mm; A and B denote intermediate coefficients, and are dimensionless quantities; a denotes a plugging position in mm, $a=x_1-R$; $x_1$ denotes a horizontal coordinate of one of ends of the plugging zone in mm; R denotes a radius of the borehole in mm; x denotes a horizontal coordinate of any position in a fracture length direction in mm; λ denotes a ratio of the maximum horizontal principle stress to the minimum horizontal principle stress, and is a dimensionless quantity; $\sigma_H$ denotes the maximum horizontal principle stress in MPa; w denotes a fracture width at the plugging position in mm; b denotes a length of the plugging zone in mm; $K_z$ denotes a permeability of the plugging zone in mD; $K_i$ denotes a permeability of the formation in mD; $I_d$ denotes a distance of a pressure decay at the fracture tip in mm; $P_i$ denotes an original formation pressure in MPa; v denotes the Poisson's ratio, and is a dimensionless quantity; E denotes an elasticity modulus of formation rock in GPa; and c denotes a coefficient related to the fracture length and the radius of the borehole.

In some embodiments, the fracture length, the distance from the fracture tip to the center of the borehole, the maximum horizontal principle stress, the minimum horizontal principle stress, the permeability of the plugging zone, the permeability of the formation, the length of the fracture tip, the horizontal coordinate of the plugging zone at the fracture tip, the fracture width at the plugging position, the length of the plugging zone, the original formation pressure, and the elastic modulus of the formation rock can be obtained from measurement and uploaded to the computer or the processor through a user terminal. The geometric coefficients $F_\lambda(s)$, $F_{o\lambda}(s)$, and $F_1(s)$ can be calculated by Eqs. (2)-(4). The ratio of the maximum horizontal principle stress to the minimum horizontal principle stress can be calculated by Eq. (5). The intermediate coefficient A, the intermediate coefficient B, and the coefficient c can be set based on experience.

In a specific embodiment, the fractured formation plugging pressure capacity prediction model is solved using a secant method. By substituting parameters such as the principle stress, the mechanical parameters of the rock, the formation permeability, the borehole size, the fracture length, and the geometry and permeability of the plugging zone into the fractured formation plugging pressure-bearing capacity prediction model, the fracture width distribution of the well wall and the fracture extension pressure at a given plugging position can be obtained.

Specifically, the method of solving the fractured formation plugging pressure-bearing capacity prediction model includes the following operations:

First, an initial assignment is made to $P_w$ and the fracture width distribution of the well wall is calculated according to Eq. (8), where the coefficient c in Eq. (8) can be expressed in metric units as:

$$c = \frac{0.137R^{0.5}}{[L+3(x-R)]^{\frac{1}{1.3}}} \quad (10)$$

Secondly, the fracture width at the plugging position is calculated based on the plugging position a, in Eq. (8):

$$x = a + \frac{b}{2}$$

Again, the fluid pressure at the fracture tip Pt is calculated according to Eq. (7).

Then, the total type 1 stress intensity factor $K_I$ at the fracture tip considering the plugging effect is calculated according to Eqs. (1) to (6) and (9).

Finally, the $K_I$ calculated above is compared with the critical stress intensity factor $K_{IC}$ of the formation rock; if $K_I=K_{IC}$, the assigned $P_w$ is the pressure-bearing capacity of plugged fracture; and if $K_I \neq K_{IC}$, the $P_w$ should be reassigned. The above operations are repeated until $K_I=K_{IC}$.

In the fractured formation plugging pressure capacity prediction model of Eqs. (1) to (9), any well wall fracture in the plugging zone is separated into three segments (a well wall vicinity region, a plugging region, and a fracture tip region), and the fluid pressure $(P)_f$ within the fracture in each segment is shown below:

$$P_f = \begin{cases} P_w & R \le |x| \le x_1 \\ P(x) = \frac{(P_w - P_t)e^{(x_1-|x|)} + (P_t - P_w e^{-a})}{1-e^{-a}} & x_1 \le |x| \le x_2 \\ P_t = \frac{\frac{wK_Z}{bK_i}P_w + \frac{2\Delta L}{I_d}P_i}{\frac{wK_Z}{bK_i} + \frac{2\Delta L}{I_d}} & x_2 \le |x| \le L+R \end{cases} \quad (11)$$

wherein $x_2$ denotes the horizontal coordinate of the other end of the plugging zone, $x_2=x_1+b$, mm.

The nonlinear fluid pressure distribution function of the plugging region is the actual pressure data obtained by the plurality of first pressure sensors through data fitting, which is more in line with the actual situation compared to the prior art (e.g., CN110826142A) if assuming as a linear fluid pressure change, thereby making the final obtained result of the pressure-bearing capacity more accurate.

Embodiment 4

A method for verifying a pressure-bearing capacity of plugged fractures, comprising: firstly, plugging the fracture by the fracture plugging simulation experimental method Embodiment 2; and then predicting the pressure-bearing capacity of plugged fracture by the method of Embodiment 3; finally, keeping the second valve open, increasing the injection pressure of the plunger pump, and continuously pumping mud or water into the simulated wellbore to establish a high-pressure environment; if the pressure of the high-pressure environment is less than or equal to the pressure-bearing capacity of plugging zone, no liquid flowing out of the bottom of the simulated wellbore, and if the pressure of the high-pressure environment is greater than the pressure-bearing capacity of plugging zone, liquid flowing out of the bottom of the simulated wellbore, then the predicted pressure-bearing capacity of plugging zone is consistent with the reality.

Embodiment 5

A method for testing a backflow capacity of a lost circulation material, comprising: after the test in Embodiment 4 is completed, connecting the output end of the pipeline of the plunger pump with the output pipeline at the bottom of the simulated wellbore, reversely injecting mud or water into the simulated wellbore through the plunger pump, and calculating the backflow quantity of the lost circulation material through a pressure change or a discharge volume of the simulated wellbore.

The above description is only preferable embodiments of the present disclosure, and is not any form of limitation of the present disclosure. Although the present disclosure has been disclosed in preferable embodiments as described above, it is not intended to limit the present disclosure. Those skilled in the art may make some changes or modifications as equivalent embodiments based on the technical content of the present disclosure within the scope of the technical solution of the present disclosure. Any person skilled in the art, without departing from the scope of the technical solution of the present disclosure, may use the technical content of the above disclosure to make some changes or modifications as equivalent embodiments. Any simple modifications, equivalent changes, and modifications based on the technical substance of the present disclosure are still within the scope of the technical solution of the present disclosure.

What is claimed is:

1. A fracture plugging simulation experimental device, wherein the fracture plugging simulation experimental device includes a simulated wellbore and a processor, a simulated formation matching the simulated wellbore is disposed in the simulated wellbore, a simulated fracture penetrating through an axial direction of the simulated formation is disposed in the simulated formation, a plurality of first pressure sensors connected with a computer are disposed on an inner wall surface of the simulated fracture, the plurality of first pressure sensors are uniformly distributed along the axial direction and a radial direction of the simulated formation, and two ends of the simulated fracture are provided with one of the plurality of first pressure sensors, respectively, and the plurality of first pressure sensors are configured to obtain pressure data of the simulated fracture during a plugging process, the pressure data characterizes a fluid pressure change of the simulated fracture in the plugging process, and a plurality of temperature sensors are provided in the simulated fracture, the plurality of temperature sensors in the simulated fracture are configured to obtain temperature data of the simulated fracture, and a plurality of strain gauges connected with the computer are disposed on the inner wall surface of the simulated fracture;

an upper end of the simulated wellbore is connected with a mixing barrel, a mixing device and a temperature sensor are disposed in the mixing barrel, a liquid injection port and a pressurization port are disposed at a top of the mixing barrel, the liquid injection port is connected with a plugging fluid storage tank, the pressurization port is connected with an output end of a plunger pump, a second pressure sensor and a first valve are disposed on a pipeline between the pressurization port and the plunger pump in sequence, and an input end of the plunger pump is connected with a liquid storage barrel;

a bottom end of the simulated wellbore is connected with a liquid collection tank, a third pressure sensor and a second valve are disposed on a pipeline between the simulated wellbore and the liquid collection tank, the liquid collection tank is connected with the plugging fluid storage tank, and the simulated wellbore and the mixing barrel are connected with a heating device, respectively;

the processor is in communication connection with components of the fracture plugging simulation experimental device, wherein the processor is configured to:
obtain a simulated fracture parameter of the simulated fracture and a simulated formation feature of the simulated formation uploaded by a user based on a user terminal;
determine a lost circulation material parameter and a set experimental parameter based on the simulated fracture parameter of the simulated fracture and the simulated formation feature of the simulated formation;
determine an experimental simulation degree based on the pressure data and the temperature data;
update operation parameters based on the experimental simulation degree; wherein the operation parameters refer to operating parameters of equipment related to the fracture plugging simulation experimental device, wherein the operating parameters of equipment related to the fracture plugging simulation experimental device include a pressurization amplitude of a single pressurization of a plunger pump, heating power of a heating device, and/or rotational speed of a rotating mechanism;
control the plunger pump, the heating device, and the rotating mechanism to operate based on the updated operation parameters until experimental parameters reach the set experimental parameter.

2. The fracture plugging simulation experimental device of claim 1, wherein the processor is further configured to:
obtain a pressure bearing prediction model based on at least one set of training samples in an alternate training of an initial pressure bearing prediction model, wherein a learning rate of the alternate training based on the at least one set of training samples is determined based on training sample features; and
determine a pressure-bearing capacity of plugged fracture through the pressure bearing prediction model based on the pressure data, strain data of the strain gauges, the set experimental parameter, and the lost circulation material parameter, wherein the pressure bearing prediction model is a machine learning model.

3. The fracture plugging simulation experimental device of claim 1, wherein the plurality of the strain gauges are uniformly distributed along the axial direction and the radial directions of the simulated formation, respectively.

4. The fracture plugging simulation experimental device of claim 1, wherein an inner surface of the simulated formation is one of a three-dimensional curved surface, a horizontal surface, and a wedge-shaped surface.

5. The fracture plugging simulation experimental device of claim 1, wherein the plugging simulation experimental device further includes an electronic scale, and the liquid collection tank is disposed on the electronic scale; and a pipeline between a bottom end of the simulated wellbore and the liquid collection tank is connected by a pressure hose.

6. The fracture plugging simulation experimental device of claim 1, wherein the plugging simulation experimental device further includes a turnover mechanism, the turnover mechanism is connected with the mixing barrel and/or the simulated wellbore to control the mixing barrel and the simulated wellbore connected as a whole to rotate and fix within 360°, and ° refers to Degree.

7. The fracture plugging simulation experimental device of claim 1, wherein the lost circulation material includes rigid particles and elastic particles, and the rigid particles include a plurality of rigid particles of different particle sizes.

\* \* \* \* \*